(12) United States Patent
Matsuda

(10) Patent No.: US 8,944,948 B2
(45) Date of Patent: Feb. 3, 2015

(54) FLAT BELT

(75) Inventor: Hisashi Matsuda, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 96 days.

(21) Appl. No.: 13/258,834

(22) PCT Filed: Mar. 26, 2009

(86) PCT No.: PCT/JP2009/001368
§ 371 (c)(1),
(2), (4) Date: Sep. 22, 2011

(87) PCT Pub. No.: WO2010/109533
PCT Pub. Date: Sep. 30, 2010

(65) Prior Publication Data
US 2012/0021860 A1    Jan. 26, 2012

(51) Int. Cl.
*F16G 1/00*    (2006.01)
*F16G 5/00*    (2006.01)
*F16G 9/00*    (2006.01)
*F16G 1/08*    (2006.01)

(52) U.S. Cl.
CPC .................................. *F16G 1/08* (2013.01)
USPC .......................... 474/263; 474/261; 474/260

(58) Field of Classification Search
USPC ........................................ 474/260, 263, 264
See application file for complete search history.

(56) References Cited

U.S. PATENT DOCUMENTS

| 2002/0039947 A1* | 4/2002 | Hasaka et al. ................. 474/263 |
| 2009/0011884 A1 | 1/2009 | Nakashima et al. |
| 2009/0029818 A1* | 1/2009 | Takahashi ....................... 474/263 |
| 2009/0042684 A1* | 2/2009 | Takahashi et al. ............. 474/263 |

FOREIGN PATENT DOCUMENTS

| JP | 61-286637 | 12/1986 |
| JP | 06-047155 | 11/1994 |
| JP | 2001-153186 | 6/2001 |
| JP | 2005-180486 | 7/2005 |
| JP | 3721220 | 11/2005 |
| JP | 2006-292134 | 10/2006 |
| JP | 2007-239821 | 9/2007 |
| WO | 2007018148 | 2/2007 |

OTHER PUBLICATIONS

International Search Report, PCT/JP2009/001368, May 19, 2009.

* cited by examiner

*Primary Examiner* — Henry Liu
(74) *Attorney, Agent, or Firm* — Young & Thompson

(57) ABSTRACT

A flat belt (B) includes a cord retaining layer (11) in which a cord (14) extending in a belt length direction and arranged helically at a certain pitch in a belt width direction is embedded, and an inner rubber layer (12) provided on a belt inner side of the cord retaining layer (11) and serving as a pulley contracting portion. The cord retaining layer (11) is made of a rubber composition containing short fibers (15) which are mixed in a rubber component in an amount of 1 to 20 parts by mass relative to 100 parts by mass of the rubber component, and are dispersed to be oriented in the belt width direction. The inner rubber layer (12) is made of a rubber composition not containing short fibers (15).

20 Claims, 3 Drawing Sheets

FLAT BELT

TECHNICAL FIELD

The present invention relates to flat belts having a cord retaining layer in which a cord extending in a belt length direction and arranged helically at a certain pitch in a belt width direction is embedded, and an inner rubber layer provided on a belt inner side of the cord retaining layer and serving as a pulley contacting portion.

BACKGROUND ART

To increase durability of power transmission belts, a cord retaining layer in which a cord is embedded, and a rubber layer provided on the inner side or outer side of the cord retaining layer have been made of rubber compositions having different elastic moduli.

Patent Document 1 discloses a V-belt in which a rubber layer having a higher elastic modulus than a cord retaining layer is provided on the outer side of the cord retaining layer; on the other hand, a rubber layer having a lower elastic modulus than the cord retaining layer is provided on the inner side of the cord retaining layer.

Patent Document 2 discloses a toothed belt which has a cord retaining layer made of a rubber composition in which short fibers are oriented in a belt thickness direction, and a toothed rubber layer provided on the inner side of the cord retaining layer and made of a rubber composition not including short fibers.

Patent Document 3 discloses a flat belt in which a rubber layer mixed with short fibers is provided between a cord retaining layer and an inner rubber layer provided on the belt inner side of the cord retaining layer and serving as a pulley contacting portion.

Patent Document 4 discloses a flat belt having a reinforcement fabric between a cord retaining layer made of a thermoplastic resin and each of surface layers provided on both surfaces of the cord retaining layer.

Patent Document 1: Japanese Patent Publication No. S61-286637
Patent Document 2: Japanese Patent Publication No. 2005-180486
Patent Document 3: Japanese Examined Utility Model Application Publication No. H06-047155
Patent Document 4: Japanese Patent Publication No. 2001-153186

SUMMARY OF THE INVENTION

A flat belt of the present invention includes: a cord retaining layer in which a cord extending in a belt length direction and arranged helically at a certain pitch in a belt width direction is embedded; and an inner rubber layer provided on a belt inner side of the cord retaining layer and serving as a pulley contacting portion, wherein the cord retaining layer is made of a rubber composition containing short fibers which are mixed in a rubber component in an amount of 1 to 20 parts by mass relative to 100 parts by mass of the rubber component, and are dispersed to be oriented in the belt width direction, and the inner rubber layer is made of a rubber composition not containing short fibers.

DESCRIPTION OF EMBODIMENTS

An embodiment will be described below.

A flat belt according to the present embodiment includes a cord retaining layer in which a cord extending in a belt length direction and arranged helically at a certain pitch in a belt width direction is embedded, and an inner rubber layer provided on a belt inner side of the cord retaining layer and serving as a pulley contacting portion. The cord retaining layer is made of rubber composition containing short fibers which are mixed in a rubber component in an amount of 1 to 20 parts by mass relative to 100 parts by mass of the rubber component, and are dispersed in the belt width direction. The inner rubber layer is made of a rubber composition not containing short fibers.

Unlike V-belts, flat belts do not provide wedge effect on a pulley, and is driven only by friction between the flat belt and the pulley. Thus, the flat belts easily cause snaking, and running of the belt is less stabilized. To avoid this, flat belt pulleys are provided with flanges on both edges, or have a crown shape whose diameter becomes smaller from a central portion to the edges to reduce snaking of the flat belt. Accordingly, the flat belts are used mainly for low load transportation or power transmission.

In recent years, pulleys capable of controlling the snaking of a flat belt are being developed. It is therefore expected that flat belts can be used for high load power transmission. However, if conventional flat belts are used for high load power transmission, durability of the belts is not sufficient.

According to the flat belt of the present embodiment, the cord retaining layer contains a proper amount of short fibers oriented in the belt width direction. Thus, shrinkage and deformation of the cord retaining layer in the belt width direction due to frictional heat generated during belt running are reduced, and a load can be equally shared by the cords arranged in the belt width direction. Further, the stiffness in the belt width direction is increased without an increase in bending stiffness in the belt length direction. Accordingly, the belt can exhibit superior durability, also when used for high load power transmission. Moreover, since no short fiber is contained in the inner rubber layer serving as a pulley contacting portion, a coefficient of friction of a surface of the inner rubber layer is not reduced.

Figure 1:
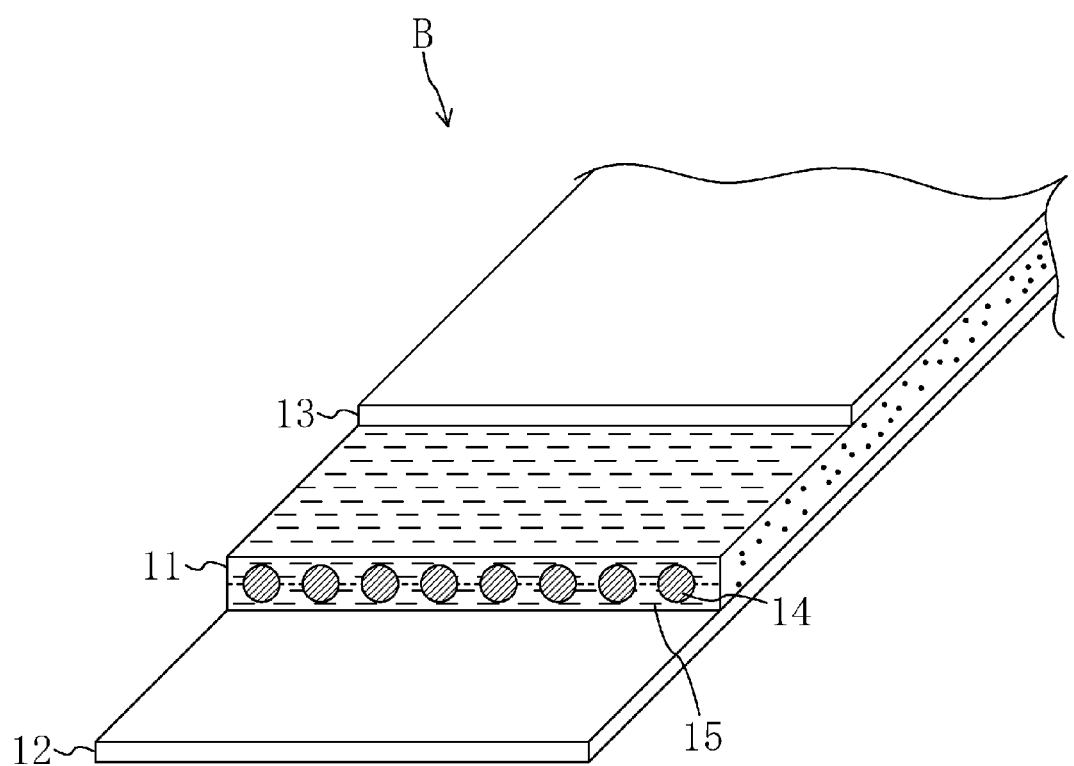
FIG. 1 is an oblique view showing a structure of a flat belt according to an embodiment.

FIG. 1 is an example flat belt B according to the present embodiment.

The flat belt B according to the present embodiment is favorably used for high load power transmission, specifically for drive transmission for blowers, compressors, or generators, or for transportation, for example. Further, the flat belt B according to the present embodiment can be used as A-type, B-type, and C-type V-belts specified in Japanese Industrial Standards (JIS) K6323, and further can be used as a friction power transmission belt, such as a V-ribbed belt used for driving a vehicle accessory.

The flat belt B according to the present embodiment has a 3-layer structure including a cord retaining layer 11 constituting an intermediate layer of the belt, an inner rubber layer 12 provided on an inner side of the belt, and an outer rubber layer 13 provided on an outer side of the belt. A cord 14 extending in a belt length direction and arranged helically at a certain pitch in the belt width direction is embedded in the cord retaining layer 11. The flat belt B has, for example, a length of 600 to 3000 mm, a width of 10 to 20 mm, and a thickness of 2 to 3.5 mm.

The cord retaining layer 11 is in the shape of a strip having an oblong cross section, and has a thickness of 0.3 to 1.0 mm, for example. The cord retaining layer 11 is made of a rubber composition produced by heating and pressing an unvulcanized rubber composition prepared by kneading a rubber component mixed with a compounding ingredient, and crosslinking the kneaded product by a crosslinker.

Examples of the rubber component of the rubber composition forming the cord retaining layer 11 include, for example, ethylene-α-olefin elastomer, such as ethylene-propylene rubber (EPR) and ethylene-propylene-diene monomer rubber (EPDM), chloroprene rubber (CR), chlorosulfonated polyethylene rubber (CSM), and hydrogenated nitrile rubber (H—NBR). Among them, ethylene-α-olefin elastomer or hydrogenated nitrile rubber is preferable as the rubber component in terms of heat resistance of the rubber. The rubber component may be made of single rubber, or rubber in which two or more types of rubber are mixed.

Examples of the compounding ingredients mixed in the rubber composition forming the cord retaining layer 11 include, for example, crosslinkers, crosslinking aids, vulcanization accelerators, antioxidants, reinforcing agents, fillers, fortifiers, plasticizers, process aids, stabilizers, colourants. Each of the compounding ingredients may be made of single material, or two or more materials.

Examples of the crosslinkers include, for example, an organic peroxide and sulfur.

Examples of the organic peroxide include, for example, dialkyl peroxides such as a dicumyl peroxide, peroxy esters such as a t-butylperoxy acetate, and ketone peroxides such as a dicyclohexanone peroxide. The organic peroxide is mixed in a rubber component preferably in an amount of 0.5 to 30 parts by mass, more preferably 1 to 15 parts by mass, relative to 100 parts by mass of the rubber component. If the crosslinker is an organic peroxide, it is preferable to further mix a crosslinking aid. Examples of the crosslinking aid include, for example, triallyl isocyanurate (TAIC). The crosslinking aid may be made of a single material, or two or more materials.

The sulfur is mixed in a rubber component preferably in an amount of 0.2 to 3.5 parts by mass, more preferably 1 to 3 parts by mass, relative to 100 parts by mass of the rubber component. If the crosslinker is sulfur, it is preferable to further mix a crosslinking promoter. Examples of the crosslinking promoter include, for example, N-oxydiethylene benzothiazole-2-sulfenamide (OBS). The crosslinking promoter may be made of a single material, or two or more materials.

Examples of the antioxidant include, for example, an amine-based antioxidant and a phenol-based antioxidant. The antioxidant is mixed in a rubber component preferably in an amount of 0.1 to 5 parts by mass, more preferably 0.5 to 3 parts by mass, relative to 100 parts by mass of the rubber component.

Examples of the reinforcing agent include, for example, carbon blacks such as furnace black and thermal black. The reinforcing agent is mixed in a rubber component preferably in an amount of 20 to 100 parts by mass, more preferably 40 to 80 parts by mass, relative to 100 parts by mass of the rubber component.

Examples of the filler include, for example, calcium carbonate, talc, diatomaceous earth. The filler is mixed in a rubber component preferably in an amount of 5 to 50 parts by mass, more preferably 5 to 30 parts by mass, relative to 100 parts by mass of the rubber component.

Examples of the fortifier include silica, etc. The fortifier is mixed in a rubber component preferably in an amount of 5 to 80 parts by mass, more preferably 5 to 60 parts by mass, relative to 100 parts by mass of the rubber component.

Examples of the plasticizer include dialkyl phthalate such as dibutylphthalate (DBP) and dioctyl phthalate (DOP), dialkyl adipate such as dioctyl adipate (DOA), dialkyl sebacate such as dioctyl sebacate (DOS), etc. The plasticizer is mixed in a rubber component preferably in amount of 0.1 to 40 parts by mass, more preferably 0.1 to 20 parts by mass, relative to 100 parts by mass of the rubber component.

Examples of the process aid include paraffinic oil, naphthenic oil, aromatic oil, etc. The process aid is mixed in a rubber component preferably in an amount of 0.1 to 40 parts by mass, more preferably 0.1 to 20 parts by mass, relative to 100 parts by mass of the rubber component.

Short fibers 15 are dispersed in the rubber composition forming the cord retaining layer 11 such that the short fibers are oriented in the belt width direction.

Examples of the short fibers 15 include, for example, nylon 6 short fibers, nylon 6,6 short fibers, polyester short fibers, cotton short fibers, and aramid short fibers. The short fibers 15 may be made of a single material, or two or more materials.

The short fibers 15 is mixed in a rubber component preferably in amount of 1 to 20 parts by mass, more preferably 1 to 10 parts by mass, relative to 100 parts by mass of the rubber component.

The length of the short fiber 15 is preferably 0.1 to 5 mm, more preferably 0.5 to 3 mm.

The tensile modulus of the short fiber 15 is preferably 1 to 800 CN/dtex, more preferably 20 to 600 CN/dtex. The tensile modulus can be measured according to JIS L 1013, using filament before cut.

The short fibers 15 may or may not be subjected to a so-called adhesion treatment on the surfaces of the short fibers 15. Examples of the adhesion treatment include, for example, immersing the short fibers 15 in an aqueous solution of resorcin/formalin/latex (hereinafter referred to as an RFL aqueous solution) etc., and then heating the short fibers 15, and immersing the short fibers 15 in rubber cement, and then drying the short fibers 15.

The inner rubber layer 12 is in the shape of a strip having an oblong cross section, and has a thickness of 0.5 to 1.5 mm, for example. The inner rubber layer 12 is made of a rubber composition produced by heating and pressing an unvulcanized rubber composition prepared by kneading a rubber component mixed with a compounding ingredient, and crosslinking the kneaded product by a crosslinker. The inner rubber layer 12 constitutes a pulley contacting portion.

Examples of the rubber component of the rubber composition forming the inner rubber layer 12 include the same material as used to form the cord retaining layer 11.

Examples of the compounding ingredient mixed in the rubber composition of the inner rubber layer 12 include the same material as used to form the cord retaining layer 11.

The rubber composition forming the inner rubber layer 12 does not contain the short fibers 15.

The outer rubber layer 13 is in the shape of a strip having an oblong cross section, and has a thickness of 0.5 to 1.5 mm, for example. The outer rubber layer 13 is made of a rubber composition produced by heating and pressing an unvulcanized rubber composition prepared by kneading a rubber component mixed with a compounding ingredient, and crosslinking the kneaded product by a crosslinker. The outer rubber layer 13 constitutes a back surface portion of the belt.

Examples of the rubber component of the rubber composition forming the outer rubber layer 13 include the same material as used to form the cord retaining layer 11.

Examples of the compounding ingredient mixed in the rubber composition forming the outer rubber layer 13 include the same material as used to form the cord retaining layer 11.

The rubber composition forming the outer rubber layer 13 may contain short fibers like the cord retaining layer 11, or may not contain short fibers like the inner rubber layer 12.

If the rubber composition forming the outer rubber layer 13 contains short fibers, examples of the short fibers include the same type as contained in the cord retaining layer 11. The short fibers are mixed in a rubber component preferably in an amount of 1 to 20 parts by mass, more preferably 1 to 10 parts by mass, relative to 100 parts by mass of the rubber component. The length of the short fiber is preferably 0.1 to 5 mm, more preferably 0.5 to 3 mm. The tensile modulus of the short fiber is preferably 1 to 800 CN/dtex, more preferably 20 to 600 CN/dtex. The short fibers may be dispersed to be oriented in any of a belt width direction, a belt length direction, or a belt thickness direction, or may not be oriented. The short fiber may or may not be subjected to a so-called adhesion treatment on the surface thereof.

The rubber components of the cord retaining layer 11, the inner rubber layer 12, and the outer rubber layer 13 may be made of the same material, or may be made of materials different from one another.

The cord 14 may be made of twisted yarn of polyester fiber, such as polyethylene terephthalate (PET) fiber and polyethylene naphthalate (PEN) fiber, aramid fiber, vinylon fiber, etc. The cord 14 has an outer diameter of, for example, 0.1 to 2.0 mm.

The cord 14 may be embedded in the center of the cord retaining layer 11 in the belt thickness direction, may be embedded closer to the inner rubber layer 12 in the belt thickness direction, or may be embedded closer to the outer rubber layer 13 in the belt thickness direction.

To provide the cord 14 with an adhesion property to the cord retaining layer 11, adhesion treatment is preferably performed on the cord 14 before forming the belt by immersing the cord material in the RFL aqueous solution, and heating the immersed cord material, and/or immersing the cord material in rubber cement, and drying the immersed cord material.

According to the flat belt B having the above structure, the cord retaining layer 11 contains a proper amount of the short fibers 15 oriented in the belt width direction. Thus, shrinkage and deformation of the cord retaining layer 11 in the belt width direction due to frictional heat generated during belt running are reduced, and a load can be equally shared by the cords 15 arranged in the belt width direction. Further, the stiffness in the belt width direction is increased without an increase in bending stiffness in the belt length direction. Accordingly, running of the belt can be highly stabilized, and the belt can exhibit superior durability when the belt is wound around a small-diameter pulley, and also when the belt is used for high load power transmission. Moreover, since no short fiber is contained in the inner rubber layer 12 serving as a pulley contacting portion, a coefficient of friction of a surface of the inner rubber layer is not reduced.

Figure 2A:
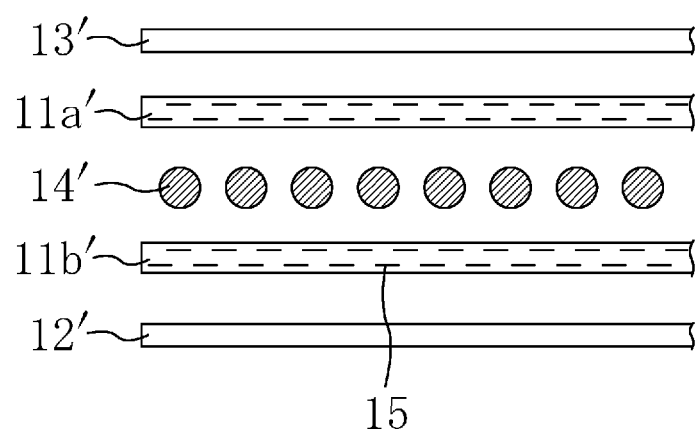
FIG. 2 is an illustrative drawing showing a method for manufacturing a flat belt.
Figure 2B:
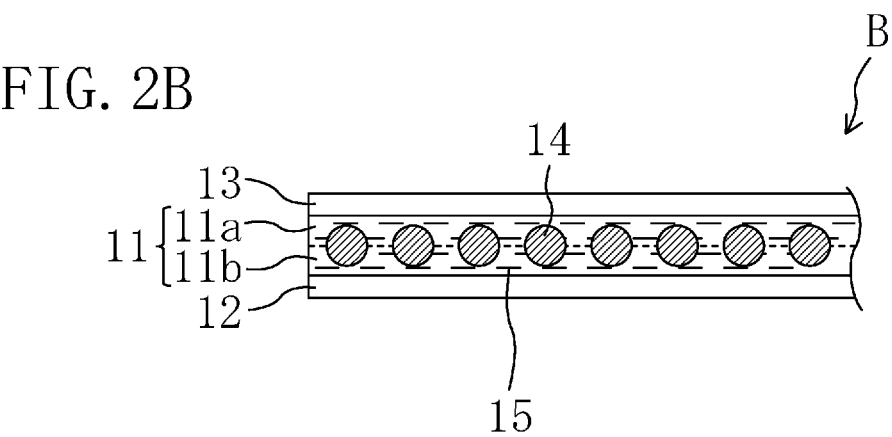

Now, a method for manufacturing the flat belt B according to the present embodiment will be described with reference to FIG. 2.

A cylindrical mold and a rubber sleeve (both not shown) are used in manufacturing the flat belt B according to the present embodiment.

First, an unvulcanized rubber sheet 13' for forming the outer rubber layer 13 is wrapped around an outer circumference of the cylindrical mold predetermined times. Then, an unvulcanized rubber sheet 11a' for forming an outer surface portion of the cord retaining layer 11 is wrapped around the unvulcanized rubber sheet 13' predetermined times. The unvulcanized rubber sheet 11a' used herein contains short fibers 15 oriented in one direction in a sheet plane. The short fibers 15 are oriented in an axial direction of the cylindrical mold.

Then, twisted yarn 14' is helically wound around the unvulcanized rubber sheet 11a', and an unvulcanized rubber sheet 11b' for forming an inner surface portion of the cord retaining layer 11 is wrapped around the twisted yarn 14'. Here, similar to the short fibers 15 described above, short fibers 15 are oriented in a circumferential direction of the cylindrical mold.

Next, an uncrosslinked rubber sheet 12' for forming an inner rubber layer 12 is wrapped around the unvulcanized rubber sheet 11b'. The uncrosslinked rubber sheet 12' does not contain short fibers.

After that, the rubber sleeve is put on the obtained product provided on the cylindrical mold, and the rubber sleeve and the cylindrical mold are placed in a molding furnace to heat the whole object with high temperature water vapor etc., and press the rubber sleeve radially inward with high pressure. At this times, the unvulcanized rubber composition flows, and a crosslinking reaction proceeds. Simultaneously, the twisted yarn 14' is reacted to adhere to the rubber. As a result, a tubular belt slab is obtained.

The cylindrical mold is taken from the molding furnace, and the belt slab is removed from the cylindrical mold.

Lastly, the outer surface and the inner surface of the belt slab are polished to make the inner rubber layer 12 and the outer rubber layer 13 have uniform thicknesses. Then, the belt slab is cut into pieces to have a predetermined width. Each of the belt slab pieces is turned inside out, thereby obtaining the flat belt B.

In the present embodiment, the flat belt B has a 3-layer structure including the cord retaining layer 11, the inner rubber layer 12, and the outer rubber layer 13. However, the flat belt B is not specifically limited to the 3-layer structure, but may have a 2-layer structure, or a 4-layer structure, as long as structures similar to the cord retaining layer 11 and the inner rubber layer 12 described in the present embodiment are included.

EXAMPLES

Evaluation tests on the flat belt will be described.
(Components of Rubber Composition)
<Rubber Compositions of Cord Retaining Layer>
The following rubber compositions 1-14 of the cord retaining layer were prepared. Details are also shown in Table 1.
—Rubber Composition 1—
Ethylene-propylene-diene monomer rubber (EPDM) (produced by The Dow Chemical Company, trade name: Nordel IP 4640) was used as a rubber component. The rubber component, and 70 parts by mass of carbon black FEF (produced by Tokai Carbon Co., Ltd., trade name: SEAST SO), 10 parts by mass of paraffinic oil (produced by Japan Sun Oil Company, Ltd., trade name: SUMPAR 2280), 1 part by mass of stearic acid (produced by New Japan Chemical Co., Ltd., trade name: stearic acid 50S), 5 parts by mass of zinc oxide (produced by Sakai Chemical Industry Co., Ltd., trade name: zinc oxide type III), 2 parts by mass of crosslinking aid (produced by Seiko Chemical Co., Ltd., trade name: Hi-Cross M), 5 parts by mass of organic peroxide (produced by NOF CORPORATION, trade name: PERCUMYL D), and 10 parts by mass of para-aramid short fiber (produced by Teijin Limited, trade name: Technora Cut Fiber CFH3050, fiber length of 3 mm), relative to 100 parts by mass of this rubber component, were placed in an internal kneader, and kneaded by the internal kneader. The obtained rubber composition was referred to as a rubber composition 1.

The rubber composition 1 was rolled to form an unvulcanized rubber sheet, and the unvulcanized rubber sheet was press molded at 160° C. for 30 minutes to obtain a crosslinked rubber sheet. The hardness of the crosslinked rubber sheet was tested using a type A durometer according to JIS K 6253. The hardness was 88.

—Rubber Composition 2—

A rubber composition having the same components as the rubber composition 1, except that the para-aramid short fibers were mixed in an amount of 1 part by mass, was kneaded to obtain a rubber composition 2. The hardness of the rubber composition 2 was measured by a similar method as the rubber composition 1, and the hardness was 81.

—Rubber Composition 3—

A rubber composition having the same components as the rubber composition 1, except that the para-aramid short fibers were mixed in an amount of 2 parts by mass, was kneaded to obtain a rubber composition 3. The hardness of the rubber composition 3 was measured by a similar method as the rubber composition 1, and the hardness was 82.

—Rubber Composition 4—

A rubber composition having the same components as the rubber composition 1, except that the para-aramid short fibers were mixed in an amount of 5 parts by mass, was kneaded to obtain a rubber composition 4. The hardness of the rubber composition 4 was measured by a similar method as the rubber composition 1, and the hardness was 84.

—Rubber Composition 5—

A rubber composition having the same components as the rubber composition 1, except that the para-aramid short fibers were mixed in an amount of 20 parts by mass, was kneaded to obtain a rubber composition 5. The hardness of the rubber composition 5 was measured by a similar method as the rubber composition 1, and the hardness was 94.

—Rubber Composition 6—

A rubber composition having the same components as the rubber composition 1, except that instead of the para-aramid short fibers, 10 parts by mass of meta-aramid short fibers (produced by Teijin Limited, trade name: Conex Cut Fiber CFA3000, fiber length of 3 mm) were mixed, was kneaded to obtain a rubber composition 6. The hardness of the rubber composition 6 was measured by a similar method as the rubber composition 1, and the hardness was 86.

—Rubber Composition 7—

A rubber composition having the same components as the rubber composition 1, except that instead of the para-aramid short fibers, 10 parts by mass of vinylon short fibers (produced by UNITIKA, LTD., trade name: CFV3010, fiber length of 3 mm) were mixed, was kneaded to obtain a rubber composition 7. The hardness of the rubber composition 7 was measured by a similar method as the rubber composition 1, and the hardness was 85.

—Rubber Composition 8—

A rubber composition having the same components as the rubber composition 1, except that instead of the para-aramid short fibers, 10 parts by mass of cotton short fibers (produced by HASHIMOTO CORPORATION, trade name: Denim Chipper 5, fiber length of 5 mm) were mixed, was kneaded to obtain a rubber composition 8. The hardness of the rubber composition 8 was measured by a similar method as the rubber composition 1, and the hardness was 82.

—Rubber Composition 9—

A rubber composition having the same components as the rubber composition 1, except that instead of the para-aramid short fibers, 10 parts by mass of nylon short fibers (produced by Asahi Kasei Corporation, trade name: nylon 6, 6, fiber length of 3 mm) were mixed, was kneaded to obtain a rubber composition 9. The hardness of the rubber composition 9 was measured by a similar method as the rubber composition 1, and the hardness was 84.

—Rubber Composition 10—

A rubber composition having the same components as the rubber composition 1, except that instead of EPDM, EBM (ethylene-butene monomer rubber) (produced by The Dow Chemical Company, trade name: Engage ENR 7380) was used as a rubber component, was kneaded to obtain a rubber composition 10. The hardness of the rubber composition 10 was measured by a similar method as the rubber composition 1, and the hardness was 90.

—Rubber Composition 11—

A rubber composition having the same components as the rubber composition 1, except that instead of EPDM, EOM (ethylene-octene monomer rubber) (produced by The Dow Chemical Company, trade name: Engage 8180) was used as a rubber component, was kneaded to obtain a rubber composition 11. The hardness of the rubber composition 11 was measured by a similar method as the rubber composition 1, and the hardness was 92.

—Rubber Composition 12—

A rubber composition having the same components as the rubber composition 1, except that instead of EPDM, H—NBR (hydrogenated nitrile rubber) (produced by ZEON CORPORATION, trade name: Zetpol 2010H) was used as a rubber component, was kneaded to obtain a rubber composition 12. The hardness of the rubber composition 12 was measured by a similar method as the rubber composition 1, and the hardness was 86.

—Rubber Composition 13—

A rubber composition having the same components as the rubber composition 1, except that no para-aramid short fibers were mixed, was kneaded to obtain a rubber composition 13. The hardness of the rubber composition 13 was measured by a similar method as the rubber composition 1, and the hardness was 79.

—Rubber Composition 14—

A rubber composition having the same components as the rubber composition 1, except that the para-aramid short fibers were mixed in an amount of 25 parts by mass, was kneaded to obtain a rubber composition 14. The hardness of the rubber composition 14 was measured by a similar method as the rubber composition 1, and the hardness was 96.

<Rubber Compositions of Inner and Outer Rubber Layers>

The following rubber compositions 15 and 16 were prepared as rubber for an inner rubber layer and an outer rubber layer. Details are also shown in Table 1.

—Rubber Composition 15—

A rubber composition having the same components as the rubber composition 1, except that no para-aramid short fibers were mixed, was kneaded as a rubber composition 15 of the inner and outer rubber layers. The hardness of the rubber composition 15 was measured by a similar method as the rubber composition 1, and the hardness was 79. The rubber composition 15 has the same components as the rubber composition 13 of the cord retaining layer.

—Rubber Composition 16—

A rubber composition having the same components as the rubber composition 1, except that the para-aramid short fibers were mixed in amount of 15 parts by mass, was kneaded as a rubber composition 16 of the inner and outer rubber layers. The hardness of the rubber composition 16 was measured by a similar method as the rubber composition 1, and the hardness was 90.

TABLE 1

| | Cord Retaining Layer | | | | | | | |
|---|---|---|---|---|---|---|---|---|
| | Rubber Composition 1 | Rubber Composition 2 | Rubber Composition 3 | Rubber Composition 4 | Rubber Composition 5 | Rubber Composition 6 | Rubber Composition 7 | Rubber Composition 8 |
| EPDM | 100 | 100 | 100 | 100 | 100 | 100 | 100 | 100 |
| EBM | | | | | | | | |
| EOM | | | | | | | | |
| H-NBR | | | | | | | | |
| Carbon Black | 70 | 70 | 70 | 70 | 70 | 70 | 70 | 70 |
| Paraffinic Oil | 10 | 10 | 10 | 10 | 10 | 10 | 10 | 10 |
| Stearic Acid | 1 | 1 | 1 | 1 | 1 | 1 | 1 | 1 |
| Zinc Oxide | 5 | 5 | 5 | 5 | 5 | 5 | 5 | 5 |
| Crosslinking Aid | 2 | 2 | 2 | 2 | 2 | 2 | 2 | 2 |
| Organic Peroxide | 5 | 5 | 5 | 5 | 5 | 5 | 5 | 5 |
| Para-Aramid Short Fiber | 10 | 1 | 2 | 5 | 20 | | | |
| Meta-Aramid Short Fiber | | | | | | 10 | | |
| Vinylon Short Fiber | | | | | | | 10 | |
| Cotton Short Fiber | | | | | | | | 10 |
| Nylon Short Fiber | | | | | | | | |
| Rubber Hardness | 88 | 81 | 82 | 84 | 94 | 86 | 85 | 82 |

| | Cord Retaining Layer | | | | | | Inner/Outer Rubber Layers | |
|---|---|---|---|---|---|---|---|---|
| | Rubber Composition 9 | Rubber Composition 10 | Rubber Composition 11 | Rubber Composition 12 | Rubber Composition 13 | Rubber Composition 14 | Rubber Composition 15 | Rubber Composition 16 |
| EPDM | 100 | | | | 100 | 100 | 100 | 100 |
| EBM | | 100 | | | | | | |
| EOM | | | 100 | | | | | |
| H-NBR | | | | 100 | | | | |
| Carbon Black | 70 | 70 | 70 | 70 | 70 | 70 | 70 | 70 |
| Paraffinic Oil | 10 | 10 | 10 | 10 | 10 | 10 | 10 | 10 |
| Stearic Acid | 1 | 1 | 1 | 1 | 1 | 1 | 1 | 1 |
| Zinc Oxide | 5 | 5 | 5 | 5 | 5 | 5 | 5 | 5 |
| Crosslinking Aid | 2 | 2 | 2 | 2 | 2 | 2 | 2 | 2 |
| Organic Peroxide | 5 | 5 | 5 | 5 | 5 | 5 | 5 | 5 |
| Para-Aramid Short Fiber | | 10 | 10 | 10 | 0 | 25 | 0 | 15 |
| Meta-Aramid Short Fiber | | | | | | | | |
| Vinylon Short Fiber | | | | | | | | |
| Cotton Short Fiber | | | | | | | | |
| Nylon Short Fiber | 10 | | | | | | | |
| Rubber Hardness | 84 | 90 | 92 | 86 | 79 | 96 | 79 | 90 |

(Flat Belt for Evaluation Test)

Flat belts for the following Examples 1 to 12 and Comparative Examples 1 to 4 were formed. The components for the flat belts are also shown in Table 2.

Example 1

A flat belt whose cord retaining layer was made of the rubber composition 1, and whose inner rubber layer and outer rubber layer were made of the rubber composition 15, was formed. The obtained flat belt was referred to as Example 1.

Here, the cord retaining layer was formed such that the short fibers were oriented in the belt width direction. Further, the cord was made of twisted yarn of an aramid fiber (1100 dtex). The belt had a length of 1100 mm, a width of 15 mm, and a thickness of 2.6 mm.

Example 2

A flat belt having the same structure as Example 1, except that the cord retaining layer was made of the rubber composition 2, was formed. The obtained flat belt was referred to as Example 2.

Example 3

A flat belt having the same structure as Example 1, except that the cord retaining layer was made of the rubber composition 3, was formed. The obtained flat belt was referred to as Example 3.

Example 4

A flat belt having the same structure as Example 1, except that the cord retaining layer was made of the rubber composition 4, was formed. The obtained flat belt was referred to as Example 4.

Example 5

A flat belt having the same structure as Example 1, except that the cord retaining layer was made of the rubber composition 5, was formed. The obtained flat belt was referred to as Example 5.

Example 6

A flat belt having the same structure as Example 1, except that the cord retaining layer was made of the rubber composition 6, was formed. The obtained flat belt was referred to as Example 6.

Example 7

A flat belt having the same structure as Example 1, except that the cord retaining layer was made of the rubber composition 7, was formed. The obtained flat belt was referred to as Example 7.

Example 8

A flat belt having the same structure as Example 1, except that the cord retaining layer was made of the rubber composition 8, was formed. The obtained flat belt was referred to as Example 8.

Example 9

A flat belt having the same structure as Example 1, except that the cord retaining layer was made of the rubber composition 9, was formed. The obtained flat belt was referred to as Example 9.

Example 10

A flat belt having the same structure as Example 1, except that the cord retaining layer was made of the rubber composition 10, was formed. The obtained flat belt was referred to as Example 10.

Example 11

A flat belt having the same structure as Example 1, except that the cord retaining layer was made of the rubber composition 11, was formed. The obtained flat belt was referred to as Example 11.

Example 12

A flat belt having the same structure as Example 1, except that the cord retaining layer was made of the rubber composition 12, was formed. The obtained flat belt was referred to as Example 12.

Comparative Example 1

A flat belt having the same structure as Example 1, except that the cord retaining layer was made of the rubber composition 13, was formed. The obtained flat belt was referred to as Comparative Example 1. In this flat belt, all of the cord retaining layer, the inner rubber layer, and the outer rubber layer are made of the same rubber composition.

Comparative Example 2

A flat belt having the same structure as Example 1, except that the short fibers in the cord retaining layer were oriented in the belt length direction, was formed. The obtained flat belt was referred to as Comparative Example 2.

Comparative Example 3

A flat belt having the same structure as Example 1, except that the cord retaining layer was made of the rubber composition 14, was formed. The obtained flat belt was referred to as Comparative Example 3.

Comparative Example 4

A flat belt having the same structure as Example 1, except that the inner rubber layer and the outer rubber layer were made of the rubber composition 15, was formed. The obtained flat belt was referred to as Comparative Example 4.

The inner rubber layer and the outer rubber layer were formed such that the short fibers were oriented in the belt width direction.

(Evaluation Test Method)

Figure 3:
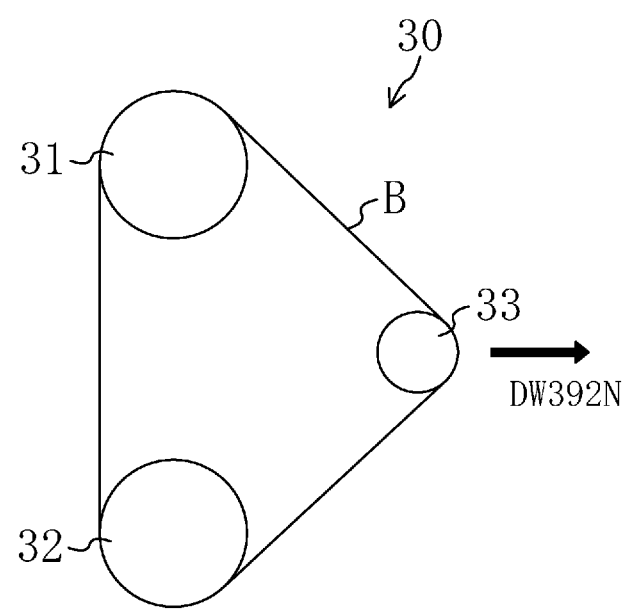
FIG. 3 is a layout of pulleys of a belt running test machine.

FIG. 3 is a layout of pulleys of a belt running test machine 30 used for evaluation tests.

The belt running test machine 30 includes large-diameter flat pulleys 31, 32 (the upper pulley is a driven pulley, and the lower pulley is a drive pulley) having a diameter of 120 mm and provided one above the other in a vertical direction, and a small-diameter flat pulley 33 having a diameter of 75 mm and provided at a position separated rightward from the midpoint between the flat pulleys 31, 32 in the vertical direction. The small-diameter flat pulley 33 is positioned on the inner side of the belt so that the contact angle of the belt is 90 degrees.

Each of the flat belts of Examples 1 to 12 and Comparative Examples 1 to 4 was wounded around the three flat pulleys 31, 32, 33, and the small-diameter flat pulley 33 was pulled in a lateral direction so that dead weight of 392 N was applied to the pulley 33. The lower flat pulley 32, which is a drive pulley, was rotated clockwise at 4900 rpm in an atmospheric temperature of 120° C., thereby driving the belt. The time until the belt became unable to run was measured as "belt running endurance time." Proportion of belt running time to the belt running endurance time of Comparative Example 1 was used as a reference of belt endurance. Further, a cause of breakdown which made the belt unable to run was observed.

(Results of Evaluation Test)

Table 2 shows the results of evaluation tests for Examples 1 to 12 and Comparative Examples 1 to 4. Further, the results for Examples 1 to 5 and Comparative Examples 1 and 3 in which only the amounts of short fibers mixed are different, are shown in Table 3.

TABLE 2

| | Example 1 | Example 2 | Example 3 | Example 4 | Example 5 | Example 6 |
|---|---|---|---|---|---|---|
| Cord Retaining Layer | Rubber Composition 1 | Rubber Composition 2 | Rubber Composition 3 | Rubber Composition 4 | Rubber Composition 5 | Rubber Composition 6 |
| Inner/Outer Layers | Rubber Composition 15 | Rubber Composition 15 | Rubber Composition 15 | Rubber Composition 15 | Rubber Composition 15 | Rubber Composition 15 |

TABLE 2-continued

| Short Fiber Orientation | Width Direction | Width Direction | Width Direction | Width Direction | Width Direction | Width Direction |
|---|---|---|---|---|---|---|
| Belt Durability | 240 | 210 | 220 | 240 | 200 | 230 |
| Breakdown Cause | Cord Separation | Cord Separation | Cord Separation | Cord Separation | Crack | Cord Separation |

|  | Example 7 | Example 8 | Example 9 | Example 10 | Example 11 | Example 12 |
|---|---|---|---|---|---|---|
| Cord Retaining Layer | Rubber Composition 7 | Rubber Composition 8 | Rubber Composition 9 | Rubber Composition 10 | Rubber Composition 11 | Rubber Composition 12 |
| Inner/Outer Layers | Rubber Composition 15 | Rubber Composition 15 | Rubber Composition 15 | Rubber Composition 15 | Rubber Composition 15 | Rubber Composition 15 |
| Short Fiber Orientation | Width Direction | Width Direction | Width Direction | Width Direction | Width Direction | Width Direction |
| Belt Durability | 240 | 240 | 250 | 180 | 200 | 190 |
| Breakdown Cause | Cord Separation | Cord Separation | Cord Separation | Cord Separation | Cord Separation | Cord Separation |

|  | Comparative Example 1 | Comparative Example 2 | Comparative Example 3 | Comparative Example 4 |
|---|---|---|---|---|
| Cord Retaining Layer | Rubber Composition 13 | Rubber Composition 1 | Rubber Composition 14 | Rubber Composition 1 |
| Inner/Outer Layers | Rubber Composition 15 | Rubber Composition 15 | Rubber Composition 15 | Rubber Composition 16 |
| Short Fiber Orientation | Width Direction | Length Direction | Width Direction | Width Direction |
| Belt Durability | 100 (Reference Value) | 40 | 50 | 60 |
| Breakdown Cause | Cord Separation | Crack | Crack | Slip |

TABLE 3

|  | Comparative Example 1 | Example 2 | Example 3 | Example 4 | Example 1 | Example 5 | Comparative Example 3 |
|---|---|---|---|---|---|---|---|
| Short Fiber Amount (phr) | 0 | 1 | 2 | 5 | 10 | 20 | 25 |
| Belt Durability | 100 (Reference Value) | 210 | 220 | 240 | 240 | 200 | 50 |

As shown in Table 2, the durability of Examples 1 to 12 in which the cord retaining layer was made of a rubber composition containing short fibers is superior to the durability of Comparative Example 1 in which the cord retaining layer was made of a rubber composition not containing short fibers.

The durability of Example 1 in which the cord retaining layer was made of a rubber composition containing short fibers dispersed to be oriented in the belt width direction is superior to the durability of Comparative Example 2 in which the cord retaining layer was made of a rubber composition containing short fibers dispersed to be oriented in the belt length direction.

The durability of Examples 1 to 12 in which the cord retaining layer was made of a rubber composition containing short fibers which were mixed in a rubber component in an amount of 1 to 20 parts by mass relative to 100 parts by mass of the rubber component is superior to the durability of Comparative Example 3 in which the cord retaining layer was made of a rubber composition containing short fibers which were mixed in a rubber component in an amount of 25 parts by mass relative to 100 parts by mass of the rubber component.

The durability of Example 1 in which the inner and outer rubber layers were made of a rubber composition not containing short fibers is superior to the durability of Comparative Example 4 in which the inner and outer rubber layers were made of a rubber composition containing short fibers.

Thus, the durability can be improved by forming the cord retaining layer with a rubber composition containing 1 to 20 parts by mass of short fibers, relative to 100 parts by mass of the rubber component, and forming the inner rubber layer and the outer rubber layer with a rubber composition not containing short fibers.

INDUSTRIAL APPLICABILITY

As described above, the present invention is useful as a flat belt.

The invention claimed is:

1. A flat belt, comprising:
   a cord retaining layer in which a cord, extending in a belt length direction and arranged helically at a certain pitch in a belt width direction, is embedded, the belt width direction being perpendicular to the belt length direction; and
   an inner rubber layer provided on a belt inner side of the cord retaining layer and positioned to serve as a pulley contacting portion of the flat belt,
   wherein the cord retaining layer is made of a rubber composition containing short fibers which are mixed in a rubber component in an amount of 1 to 20 parts by mass relative to 100 parts by mass of the rubber component, said short fibers in the rubber composition being oriented in the belt width direction, wherein the inner rubber layer is made of a rubber composition that is free of short fibers, and wherein the cord retaining layer is obtained by a crosslinking reaction that proceeds between a first unvulcanized rubber, comprising a first portion of said short fibers and on which twisted yarn, as the cord, is provided, and a second unvulcanized rubber which comprises a second portion of said short fibers and is provided on the first unvulcanized rubber with the twisted yarn positioned between the first and second unvulcanized rubbers.

2. The flat belt of claim 1, wherein
the rubber component of the rubber composition forming the cord retaining layer is an ethylene-α-olefin elastomer or a hydrogenated nitrile rubber.

3. The flat belt of claim 1, wherein
the rubber component of the rubber composition forming the cord retaining layer, and a rubber component of the rubber composition forming the inner rubber layer are the same.

4. The flat belt of claim 1, wherein
the short fibers include at least one selected from the group consisting of para-aramid short fibers, meta-aramid short fibers, vinylon short fibers, cotton short fibers, and nylon short fibers.

5. The flat belt of claim 1, further comprising:
an outer rubber layer provided on a belt outer side of the cord retaining layer and made of a rubber composition that is free of said short fibers.

6. The flat belt of claim 1, said flat belt being suitable for use as a drive transmission for a blower, a compressor or a generator, or is used for transportation.

7. The flat belt of claim 2, wherein
the rubber component of the rubber composition forming the cord retaining layer, and a rubber component of the rubber composition forming the inner rubber layer are the same.

8. The flat belt of claim 2, wherein
the short fibers include at least one selected from the group consisting of para-aramid short fibers, meta-aramid short fibers, vinylon short fibers, cotton short fibers, and nylon short fibers.

9. The flat belt of claim 3, wherein
the short fibers include at least one selected from the group consisting of para-aramid short fibers, meta-aramid short fibers, vinylon short fibers, cotton short fibers, and nylon short fibers.

10. The flat belt of claim 2, further comprising:
an outer rubber layer provided on a belt outer side of the cord retaining layer and made of a rubber composition that is free of said short fibers.

11. The flat belt of claim 3, further comprising:
an outer rubber layer provided on a belt outer side of the cord retaining layer and made of a rubber composition that is free of said short fibers.

12. The flat belt of claim 4, further comprising:
an outer rubber layer provided on a belt outer side of the cord retaining layer and made of a rubber composition that is free of said short fibers.

13. The flat belt of claim 2, said flat belt being suitable for use as a drive transmission for a blower, a compressor or a generator, or is used for transportation.

14. The flat belt of claim 3, said flat belt being suitable for use as a drive transmission for a blower, a compressor or a generator, or is used for transportation.

15. The flat belt of claim 4, said flat belt being suitable for use as a drive transmission for a blower, a compressor or a generator, or is used for transportation.

16. The flat belt of claim 5, said flat belt being suitable for use as a drive transmission for a blower, a compressor or a generator, or is used for transportation.

17. The flat belt of claim 1, wherein the rubber composition of the inner rubber layer is the same as the rubber composition of the cord retaining layer, except that the rubber composition of the inner rubber layer is free of short fibers.

18. The flat belt of claim 5, wherein the rubber composition of the outer rubber layer is the same as the rubber composition of the cord retaining layer, except that the rubber composition of the outer rubber layer is free of short fibers.

19. A flat belt, comprising:
a cord retaining layer formed of a rubber portion, with an outer-facing surface and an inner-facing surface, and a cord located within a thickness of the rubber portion between the outer-facing surface and the inner-facing surface, the cord extending in a belt length direction, and positioned helically within the thickness at a predetermined pitch in a belt width direction, the belt width direction being perpendicular to the belt length direction; and an inner rubber layer provided on the inner-facing surface of the cord retaining layer, the inner rubber layer configured to interface, in operation, with a pulley, wherein the rubber portion of the cord retaining layer is formed of a first unvulcanized rubber crosslinked with a second unvulcanized rubber provided thereon, an interface between the crosslinked first and second unvulcanized rubbers having twisted yarn, as the cord, provided therein, each of the first and second unvulcanized rubbers containing short fibers, wherein the short fibers of the rubber portion of the cord retaining layer are oriented in the belt width direction, and wherein the inner rubber layer is formed of a rubber composition that is free of short fibers.

20. The flat belt of claim 19, further comprising:
an outer rubber layer provided on the outer-facing surface of the cord retaining layer,
the outer rubber layer being formed of a rubber composition that is free of short fibers.

* * * * *